United States Patent [19]

Oba et al.

[11] 3,876,468

[45] Apr. 8, 1975

[54] METHOD FOR RECLAIMING GLASS ARTICLES

[75] Inventors: Yoichi Oba, Hachioji; Saburo Nonogaki; Mitsuru Oikawa, both of Tokyo; Kiyoshi Miura; Yoshifumi Tomita, both of Mobara, all of Japan

[73] Assignee: Hitachi, Ltd., Tokyo, Japan

[22] Filed: Mar. 19, 1973

[21] Appl. No.: 342,404

[30] Foreign Application Priority Data

Mar. 21, 1972 Japan ................................ 47-27384

[52] U.S. Cl. ...................... 134/3; 134/39; 252/364; 252/DIG. 10

[51] Int. Cl. ............................................ B08b 3/08

[58] Field of Search ........ 134/3, 34, 38, 39; 156/12, 156/15, 24, 8; 252/79.1, 79.2, 79.3, 79.4, 364, DIG. 10, 83, 84, 85; 65/28

[56] References Cited

UNITED STATES PATENTS

| | | | |
|---|---|---|---|
| 3,527,628 | 9/1970 | Fullerton et al. | 156/6 |
| 3,673,094 | 6/1972 | Kreml | 252/79.4 |

*Primary Examiner*—William A. Powell
*Assistant Examiner*—Brian J. Leitten
*Attorney, Agent, or Firm*—Craig & Antonelli

[57] ABSTRACT

An aqueous solution containing hydrofluoric acid and tannic acid was found useful as a glass cleaning composition in reclaiming clean glass panel from a defective panel rejected during manufacture of a phospor screen for color picture tube. The composition is superior to conventional compositions not only in cleaning efficiency but also in operational safety because of lower hydrofluoric acid concentration and lower treating temperature.

17 Claims, No Drawings

METHOD FOR RECLAIMING GLASS ARTICLES

This invention relates to a glass cleaning composition, and, more particularly, to a glass cleaning composition useful in removing photoresist film and carbon film adhered on a glass surface.

The phosphor screen of a black matrix color picture tube is ordinarily formed in the following way.

A uniform coating of photoresist is applied on the interior surface of a glass panel and subjected to exposure corresponding to three primary colors, G (green), B (blue), and R (red) through a shadow mask. On developing, respective relief images of photoresist film corresponding to three primary colors, G, B, and R, remain on the panel. The panel is then coated all over the surface with a non-luminescent light-absorptive substance. Subsequently, the panel is treated with an aqueous solution of oxidizing agents or the like, to remove the remaining photoresist film corresponding to three primary colors, G, B and R, and the non-luminescent light-absorptive substance coated on the photoresist film, to form so-called matrix holes corresponding to three primary colors, G, B, and R. The matrix holes are coated with respectively predetermined phosphors corresponding to three primary colors, G, B and R, to form the phosphor screen.

For the photoresist, there have been used conventionally a polyvinyl alcohol (PVA) — ammonium bichromate type, and more recently a polyvinylpyrrolidone (PVP) — water-soluble azide compound type. For the nonluminescent light-absorptive substance, is used generally black graphite.

When any panel is found not having the desired characteristics in any step of the above-said manufacturing operation of a phosphor screen, such as formation of the relief image of photoresist film or formation of the black matrix, it becomes necessary to remove photoresist, etc., adhered on the defective panel by cleaning to reclaim the panel.

Conventionally, in reclaiming the panels, an aqueous solution containing several to ten plus several percent, or, in some cases, even higher percent of hydrofluoric acid and ammonium fluoride has been used as a cleaning preparation to treat the panels at room temperature for several minutes. However, such a cleaning composition is unsatisfactory for completely removing the photoresist and carbon. This led to a serious problem because it is impossible to obtain a color picture tube with a uniform phosphor screen when such an imperfectly cleaned panel is used.

An object of this invention is to provide a cleaning composition which is free from such disadvantages of the prior art as those mentioned above and is able to give a perfectly reclaimed panel. Another object of the invention is to provide a cleaning composition which is less hazardous in handling in the aforesaid panel cleaning operation, yet can manifest full effect in a short period of time.

In order to achieve the said objects, this invention provides a cleaning composition capable of manifesting a perfect cleaning effect while maintaining operational safety, which comprises hydrofluoric acid and tannic acid in admixture.

As mentioned in the foregoing, a mixed solution of hydrofluoric acid and ammonium fluoride has conventionally been used as a cleaning preparation for panel reclaiming. However, since this mixed solution is not so effective in removing residual photoresist film and carbon film that it is necessary to use a more concentrated solution or to elevate the treating temperature, thus causing such troubles as generation of toxic gases and injury to skin or clothings. For this reason, there has been a demand for a cleaning composition which can be used in a lower concentration and at a lower temperature.

According to this invention, the above-said difficulties can be eliminated by adding tannic acid to the hydrofluoric acid, thus enabling the latter to be used in a concentration much lower than that in a conventional composition.

Although the mechanism by which tannic acid functions remains for the most part unclarified, one of its effects may presumably be an increase in stiffness of the residual photoresist due to its permeation therein, thus promoting penetration of the hydrofluoric acid along the interface between the residual photoresist and the glass surface and accelerating dissolution of the photoresist.

The concentration of hydrofluoric acid in the mixed aqueous solution is within the range from 0.01 to 10% by weight, depending upon the desired balance among operational safety, treating time, and treating temperature. Tannic acid is added to give a concentration in the range from 0.01 to 5% by weight. The cleaning composition of this invention acts effectively within several seconds to several minutes of treatment at room temperature, though it is possible to shorten the time by elevating the treating temperature.

EXAMPLE 1

In 1800 parts of water, was dissolved a photoresist polymer comprising 10 parts of polyvinylpyrrolidone and 6 parts of polyacrylamide. In the solution, were further dissolved 2 parts of sodium 4,4′-diazidostilbene-2,2′-disulfonate as a crosslinking agent and 0.16 part of N-($\beta$-aminoethyl)-$\alpha$-aminopropyltrimethoxysilane as an adhesion promoter. The resulting photoresist solution was uniformly coated on inner surface of a glass panel, dried, furnished with a shadow mask and exposed to light corresponding to three primary colors, G, B and R, which comes from an ultra-high pressure mercury lamp used as a light source at positions corresponding to three primary colors, G, B and R, respectively. The exposed photoresist layer was developed with water-spray to leave hardened dots of the photoresist corresponding to three primary colors. After drying, the panel was coated with black carbon, again dried, and immersed in a 1%-aqueous solution of sodium hypochlorite at 50°C. for 3 minutes to destroy the hardened photoresist dots. The carbon coating on the dot area was removed by water-spray to obtain a black matrix.

The black matrix panel thus obtained was treated with the cleaning compositions for reclaiming glass panel, shown in Table 1, to compare the results with one another. The comparison was made after the panel had been cleaned by immersing in each solution at 18°C. for 90 seconds, followed by a water-spray rinse for 15 seconds.

The results of comparison showed that cleaning was perfect with the compositions No. II, III, IV, V, and VI, while only partial cleaning was attained with the compositions No. VII and VIII, and no apparent change of the panel was observed when the composition No. I had been used. By using the composition No. VII, the treatment was carried out at 40°C. and 60°C. for 90 seconds with the results that cleaning proceeded a little farther as compared with the case of treating at ordinary temperature, but not to a stage of perfect cleaning.

EXAMPLE 2

A black matrix panel prepared by use of a photoresist of the same composition as mentioned in Example 1 was sprayed with a mixed solution comprising 5% of hydrofluoric acid and 1% of tannic acid for 3 seconds at a spray pressure of 0.4 $kg/cm^2$, in a trial to reclaim the panel. The results obtained proved that cleaning was perfect. This cleaning composition is also economically desirable because it may be repeatedly used.

As explained in the foregoing, in accordance with this invention, it has now become possible to provide a glass cleaning composition capable of perfectly, yet simply, reclaiming a black matrix panel in the course of manufacturing steps of a black matrix color picture tube with least operational hazard and, in addition, with economical advantage. It is to be added that the cleaning composition of this invention is applicable not only to the case of cleaning the screen panel for a color picture tube, but also widely to other cases where cleaning of glass coated on its surface with resinous substances including the photoresist is involved.

What is claimed is:

1. A method for reclaiming a glass panel for use as the phosphor screen of a color picture tube, which comprises treating the glass panel with a glass cleaning composition comprising an aqueous solution of hydrofluoric acid and tannic acid.

2. A method according to claim 1, wherein the concentration in said solution of hydrofluoric acid is 0.01 to 10 weight % and the concentration of tannic acid is 0.01 to 5 weight %.

3. A method according to claim 1, wherein said glass cleaning composition consists essentially of an aqueous solution of hydrofluoric acid and tannic acid.

4. A method according to claim 3, wherein the concentration in said solution of hydrofluoric acid is 0.01 to 10 weight % and the concentration of tannic acid is 0.01 to 5 weight %.

5. A method for reclaiming a glass article including a glass surface having a photoresist film thereon comprising contacting the glass article with a composition comprising an aqueous solution of hydrofluoric acid and tannic acid.

6. A method according to claim 5, wherein the concentration in said solution of hydrofluoric acid is 0.01 to 10 weight % and the concentration of tannic acid is 0.01 to 5 weight %.

7. A method according to claim 6, wherein the concentration in said solution of hydrofluoric acid is from 0.25 to 1 weight % and the concentration of tannic acid is from 0.5 to 2 weight %.

8. A method according to claim 5, wherein the glass article is immersed in said composition.

9. A method according to claim 5, wherein said composition is sprayed on said glass article.

10. A method according to claim 5 further comprising rinsing the glass article with water.

11. A method according to claim 5 wherein said glass article further comprises a carbon film in contact with said photoresist film.

12. A method according to claim 11, wherein said carbon film is black graphite.

13. A method according to claim 5, wherein said photoresist film is a the polyvinyl alcohol-ammonium bichromate film.

14. A method according to claim 5, wherein said photoresist film is a polyvinylpyrrolidone-water-soluble azide compound film.

15. A method according to claim 5, wherein said composition consists essentially of an aqueous solution 2 of hydrofluoric acid and tannic acid.

16. A method according to claim 15, wherein the concentration in said solution of hydrofluoric acid is 0.01 to 10 weight % and the concentration of tannic acid is 0.01 to 5 weight %.

17. A method according to claim 16, wherein said glass article is contacted with said composition for sufficient time to substantially completely remove said photoresist film.

* * * * *